(12) United States Patent
Lutz (10) Patent No.: US 11,194,141 B2
(45) Date of Patent: Dec. 7, 2021

(54) OPTICAL WHEEL AND OPTICAL ASSEMBLY FOR A SURGICAL MICROSCOPE

(71) Applicant: Carl Zeiss Meditec AG, Jena (DE)

(72) Inventor: Jochen Lutz, Neresheim-Elchingen (DE)

(73) Assignee: Carl Zeiss Meditec AG, Jena (DE)

( * ) Notice: Subject to any disclaimer, the term of this patent is extended or adjusted under 35 U.S.C. 154(b) by 232 days.

(21) Appl. No.: 16/445,484

(22) Filed: Jun. 19, 2019

(65) Prior Publication Data
US 2020/0400929 A1   Dec. 24, 2020

(51) Int. Cl.
*G02B 21/00* (2006.01)
*G02B 5/00* (2006.01)
(Continued)

(52) U.S. Cl.
CPC ......... *G02B 21/0012* (2013.01); *G01N 21/64* (2013.01); *G02B 5/005* (2013.01);
(Continued)

(58) Field of Classification Search
CPC ............ G02B 21/0012; G02B 21/0032; G02B 21/006; G02B 21/025; G02B 21/06; G02B 21/16; G02B 21/22; G02B 21/24; G02B 21/36; G02B 21/245; G02B 21/248; G02B 21/361; G02B 21/362; G02B 21/365; G02B 5/005; G02B 5/20; G02B 7/006; G02B 7/023; G02B 7/16; G02B 11/00; G02B 23/16; G02B 25/001; G02B 26/007;
(Continued)

(56) References Cited

U.S. PATENT DOCUMENTS 4,899,267 A * 2/1990 Mardon ............... H05B 47/155
362/277
6,567,225 B1 * 5/2003 Derian ................. G02B 26/007
359/885
(Continued)

FOREIGN PATENT DOCUMENTS

DE    102004006066 A1    8/2005
DE    102005041859 A1    3/2007

*Primary Examiner* — Mustak Choudhury
(74) *Attorney, Agent, or Firm* — Falk Ewers; Ewers IP Law PLLC (57) ABSTRACT

An optical assembly for a surgical microscope includes an iris diaphragm assembly arranged in a first plane and including a first adjustable diaphragm arranged in a first observation beam path of the surgical microscope and defining a first opening, and a second adjustable diaphragm arranged in a second observation beam path of the surgical microscope and defining a second opening, an optical wheel rotatably mounted on the iris diaphragm assembly in a second plane, the optical wheel including openings for receiving optical elements and optical element holders fastened to the optical wheel to secure the optical elements in the openings without creating transverse forces on the optical elements, the optical wheel having substantially a shape of a half wheel and including an external gearing provided on a circular portion of the optical wheel. A surgical microscope includes the optical assembly with the iris diaphragm assembly and the optical wheel.

20 Claims, 10 Drawing Sheets

(51) Int. Cl.
*G02B 21/36* (2006.01)
*G02B 21/06* (2006.01)
*G01N 21/64* (2006.01)
G02B 21/22 (2006.01)
G02B 21/16 (2006.01)
G02B 5/20 (2006.01)

(52) U.S. Cl.
CPC ............ *G02B 21/06* (2013.01); *G02B 21/36* (2013.01); *G01N 2021/6471* (2013.01); *G02B 5/20* (2013.01); *G02B 21/0032* (2013.01); *G02B 21/16* (2013.01); *G02B 21/22* (2013.01)

(58) Field of Classification Search
CPC ... G03B 9/02; G03B 9/06; G03B 9/07; G03B 9/08; G01N 2021/6471
See application file for complete search history.

(56) References Cited

U.S. PATENT DOCUMENTS

| | | |
|---|---|---|
| 7,777,971 B2 | 8/2010 | Moller et al. |
| 2010/0044583 A1 | 2/2010 | Steffen et al. |
| 2016/0084457 A1* | 3/2016 | Jurik ...................... F21V 11/08 362/324 |

* cited by examiner

OPTICAL WHEEL AND OPTICAL ASSEMBLY FOR A SURGICAL MICROSCOPE

TECHNICAL FIELD

The invention relates to an optical wheel, an optical assembly including the optical wheel, and a surgical microscope including the optical assembly with the optical wheel.

BACKGROUND

Optical elements, e.g., optical filters, optical lenses, etc., may be placed in observation beam paths of surgical microscopes. It is possible to arrange a plurality of different optical elements on a motor-driven full wheel and to select a respective optical element to be positioned in the observation beam path by rotating the full wheel.

Stereoscopic surgical microscopes typically require two equally configured optical elements to be synchronously positioned in two respective observation beam paths. For this purpose, each of the two equally configured optical elements may be installed in a separate full wheel, and the two full wheels may be rotated relative to each such that the two optical elements are positioned in the respective observation beam paths.

The full wheels may include opaque areas formed by webs or other full-surface areas which may block light transmitted in the observation beam paths when the full wheels are rotated. In the event of a fault, the motor-driven full wheels may remain in undesirable positions in which the opaque areas obscure or severely restrict the view of the operating field which may mean that the surgery cannot be continued with the surgical microscope or that the surgery becomes very difficult due to the lack of light transmitted in the observation beam paths.

While it is possible to provide additional mechanical wheels, which can be manually operated to turn the full wheels free, manually rotating these additional wheels may distract the surgeon from the surgery or may reposition the surgical microscope and thereby negatively impact the field of view of the surgeon.

Optical filters may have complex coatings that cause stress and deformation, and which may have a negative impact on the surface flatness. If these optical filters are glued into the full wheels, temperature changes may result in transverse forces which intensify the deformation even further. In order to counteract this aspect of the optical filters, the filters must be made unnecessarily thick.

The optical filters may be fluorescence observation filters known from fluorescence operation-microscopy. In addition, it may be desirable to change the depth of field (DoF) when the fluorescence observation filters are positioned in the observation beam path. However, while especially for ophthalmological applications, stepless aperture diaphragms are used for DoF optimization, as described, e.g., in DE 10 2004 006 066 A1, stepless aperture diaphragms are not used in combination with fluorescence. In other words, existing surgical microscopes allow to either continuously or incrementally change the DoF or to place fluorescence observation filters in the observation beam paths, but not both.

SUMMARY

It is therefore an object of the present disclosure to overcome the above-described disadvantages of existing surgical microscopes in a space-saving manner.

The object is achieved by providing an optical wheel for a surgical microscope, an optical assembly for a surgical microscope, and a surgical microscope including the optical assembly as described herein.

The optical wheel includes openings for receiving optical elements, optical element holders fastened to the optical wheel to secure the optical elements in the openings without creating transverse forces on the optical elements. The optical wheel has substantially a shape of a half wheel.

According to an aspect of the disclosure, the optical element holders are fastened to the optical wheel by an adhesive. The optical wheel includes through holes to fasten the optical element holders to the optical wheel. When fastened to the optical wheel, the optical element holders do not pass through the entire through holes and open areas in the through holes are filled with the adhesive in a way that the adhesive is not in contact with the optical elements.

According to another aspect of the disclosure, the optical wheel 200 includes an external gearing provided on a circular portion of the optical wheel.

According to yet another aspect of the disclosure, the optical elements are fluorescence observation filters and the optical wheel has a thickness of 2.0 millimeters.

The object is further achieved by providing an optical assembly for a surgical microscope including: an iris diaphragm assembly arranged in a first plane and including a first adjustable diaphragm arranged in a first observation beam path of the surgical microscope and defining a first opening, and a second adjustable diaphragm arranged in a second observation beam path of the surgical microscope and defining a second opening, an optical wheel rotatably mounted on the iris diaphragm assembly in a second plane, the optical wheel including openings for receiving optical elements and optical element holders fastened to the optical wheel to secure the optical elements in the openings without creating transverse forces on the optical elements, the optical wheel having substantially a shape of a half wheel and including an external gearing provided on a circular portion of the optical wheel. The first plane and the second plane are arranged above each other.

According to an aspect of the disclosure, a first motor is connected to the iris diaphragm assembly to adjust diameters of the first and second openings. A second motor is connected to the optical wheel via the external gearing to rotate the optical wheel between a first stop position and a second stop position. The first motor is controlled to adjust diameters of the first and second openings thereby adjusting a DoF of the surgical microscope.

According to another aspect of the disclosure, the first and second motors are stepper motors.

According to yet another aspect of the disclosure, the optical elements are fluorescence observation filters, the fluorescence observation filters are positioned in the first and second observation beam paths when the optical wheel is in the first stop position, and the entire optical wheel is positioned outside the first and second beam paths when the optical wheel is in the second stop position.

The openings for receiving the optical elements are arranged on the optical wheel such that an amount of light in the first and second observation beam paths blocked by opaque portions of the optical wheel is minimized when the optical wheel is rotated between the first and second stop positions.

According to another aspect of the disclosure, the optical wheel may be made of a transparent material to prevent light in the first and second observation beam paths from being blocked when the optical wheel is rotated between the first and second stop positions.

The optical wheel may include a first stop surface area and a second stop surface area, the iris diaphragm assembly may include a stop pin, in a first stop position, the first stop surface area of the optical wheel is in contact with the stop pin, and in the second stop position, the second stop surface area of the optical wheel is in contact with the stop pin.

According to a further aspect of the disclosure, the optical wheel may include a magnet mounted in a recess of the optical wheel, and the iris diaphragm assembly may include a sensor configured to determine a position of the optical wheel. The sensor may be a hall effect sensor.

The iris diaphragm assembly includes a first cylindrical wheel bearing, the optical wheel includes a second wheel bearing having a cylindrical portion that fits around the first cylindrical wheel bearing and a portion having a shape of a washer and defining a distance between the optical wheel and the iris diaphragm assembly when the optical wheel is mounted on the iris diaphragm assembly. The first cylindrical wheel bearing and the second wheel bearing form a wheel bearing arrangement having a predefined guide length that prevents the optical wheel from self-locking.

According to yet another aspect of the disclosure, the optical wheel is mounted on the iris diaphragm assembly by a flat-head screw fastened in a recess in the first cylindrical wheel bearing of the iris diaphragm assembly via a screw opening in the optical wheel.

The object is further achieved by providing surgical microscope including: a housing, a zoom optics mounted in the housing, an iris diaphragm assembly mounted on the zoom optics, the iris diaphragm assembly being arranged in a first plane and including a first adjustable diaphragm arranged in a first observation beam path of the surgical microscope and defining a first opening, and a second adjustable diaphragm arranged in a second observation beam path of the surgical microscope and defining a second opening, and an optical wheel rotatably mounted on the iris diaphragm assembly in a second plane, the optical wheel including openings for receiving optical elements and optical element holders fastened to the optical wheel to secure the optical elements in the openings without creating transverse forces on the optical elements, the optical wheel having substantially a shape of a half wheel and including an external gearing provided on a circular portion of the optical wheel.

According to an aspect of the disclosure, the surgical microscope is a stereoscopic microscope, and the optical elements are fluorescence observation filters.

BRIEF DESCRIPTION OF THE DRAWINGS

The disclosure will now be described with reference to the drawings wherein.

DESCRIPTION OF EXEMPLARY EMBODIMENTS

Figure 1:
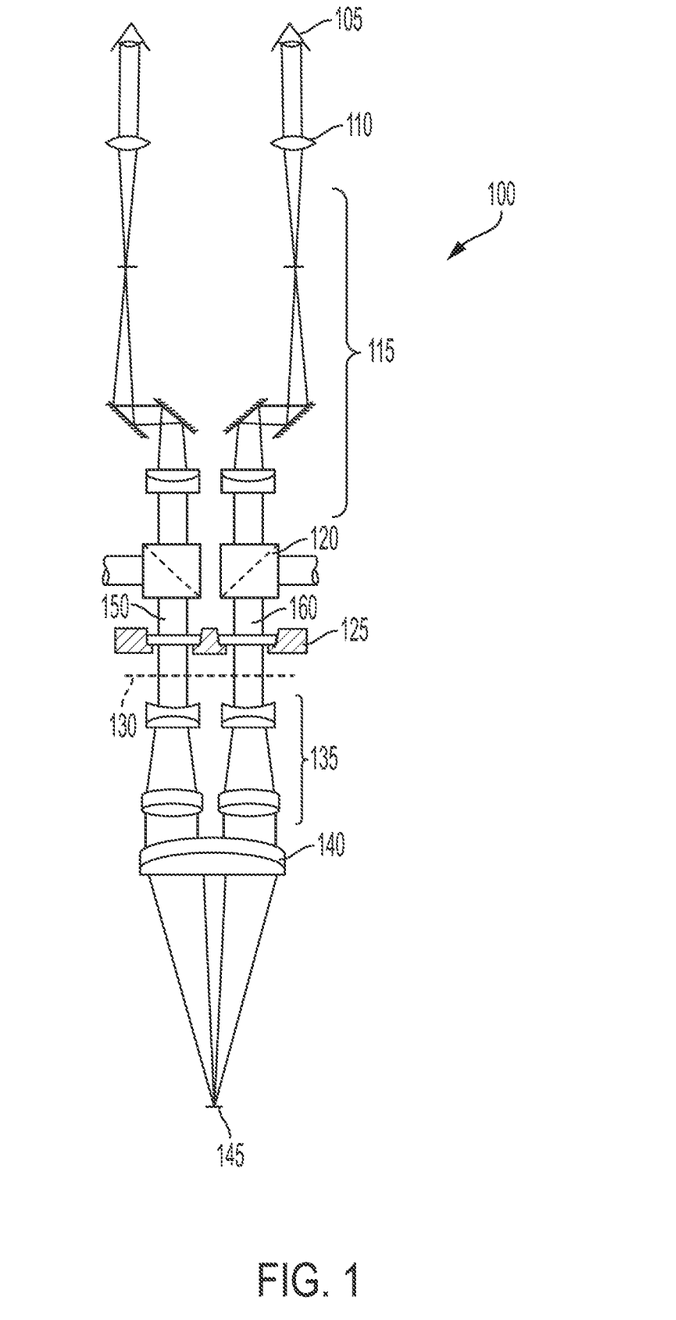
FIG. 1 shows a schematic illustration of a stereoscopic surgical microscope according to an exemplary embodiment of the disclosure.

FIG. 1 schematically shows a stereoscopic surgical microscope 100. A surgical microscope is a visualization system for observing a three-dimensional object area with an object plane. The object area is a surgery area, e.g., an area of a body of a patient in which a surgery is performed. More specifically, a surgery area may be a tissue area to be examined or operated on which may include cell tissues, bones, and/or artificial body elements. In order to describe the geometric properties for the optics of the surgical microscope in the object area, the geometric properties are defined relative to the object plane. The object plane is an observation plane in the object area. A surgical microscope includes various optical elements, such as the binocular tube 115, the beam splitters 120, the zoom optics 135, and the main lens 140, shown in FIG. 1.

The surgical microscope further includes an observation unit. The observation unit may be formed by eyepieces or may include one or more cameras. Through the eyepieces, such as oculars 110 shown in FIG. 1, an observer 105 can directly view the surgery area 145. A camera (not shown) offers the possibility of recording the surgery area and displaying it enlarged on a display device (not shown) so that the surgery area can be viewed two- or three dimensionally on a screen. Both observation variants can also be provided simultaneously.

The optics of a surgical microscope defines an observation beam path from the object area to the observation unit.

A stereoscopic surgical microscopes have two observation beam paths. A first observation beam path 150 and a second observation beam path 160 are shown in FIG. 1. Each observation beam path is assigned to one eye of the observer 105. For example, the first observation beam path 150 may be assigned to the left eye of the observer 105 and the second observation beam path 160 may be assigned to the right eye of the observer 105, or vice versa.

As shown in FIG. 1, the stereoscopic microscope 100 further includes an optical assembly provided between the beam splitters 120 and the zoom optics 135. The optical assembly includes optical wheel 125 provided in a first plane and iris diaphragm assembly 130 provided in a second plane below the first plane in a direction towards the object or surgery area 145. According to another exemplary embodiment, it is also possible to provide the iris diaphragm assembly 130 in a plane above the first plane.

In an imaging device, such as an optical or digital surgical microscope, a plane in an axial position along the optical axis of an observation beam path, in which the sharpness of the image reaches a maximum, is a focal plane. In a surgical microscope, the focal plane and the object plane are typically in the same plane.

The optics of the imaging device can not only focus on the focal plane, but also on areas above and below the focal plane. These areas are defined by the DoF. In other words, the DoF is a distance between positions along the optical axis of the observation beam path between a nearest and a furthest object or object detail that is in sharp focus. In the stereoscopic microscope 100 shown in FIG. 1, the DoF can be adjusted by the iris diaphragm assembly 130.

The surgical microscope 100 may use fluorescence to display the properties of cell tissues, bones, and/or artificial body elements. For this purpose, the surgery area is illuminated with light of a predefined wavelength or of a plurality of predefined wavelengths. The light is absorbed by fluorescent compounds or molecules in the surgery area 145 and causes these compounds or molecules to emit light of a color (typically of a higher wavelength) that is different from the color of the light absorbed by the components or molecules. The light emitted by the compounds or molecules to be observed is transmitted via the observation beam path to the observer 105 or to a camera (not shown). To detect an image of only the fluorescence part, i.e., of only the light emitted by the compounds or molecules, the light transmitted to the observer (or camera) may be filtered by a fluorescence observation filter. Such a fluorescence observation filter (or fluorescence observation filters for both observation beam paths) may be provided on the optical wheel 125 and may be selectively placed in the observation beam paths 150 and 160 when the surgical microscope is operated in fluorescence mode or may be removed from the observation beam path when the surgical microscope is operated in white light mode. Typically, the fluorescence filter allows light of the color emitted by the fluorescent components and molecules to pass whereas light having a higher or lower wavelength is blocked.

Figure 2A:
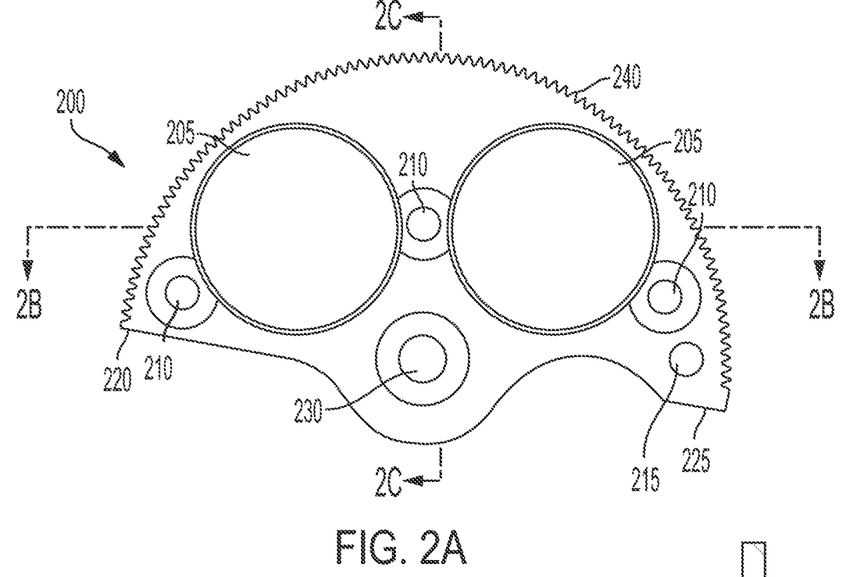
FIG. 2A shows a top plan view of an optical wheel according to an exemplary embodiment of the disclosure.
Figure 3A:
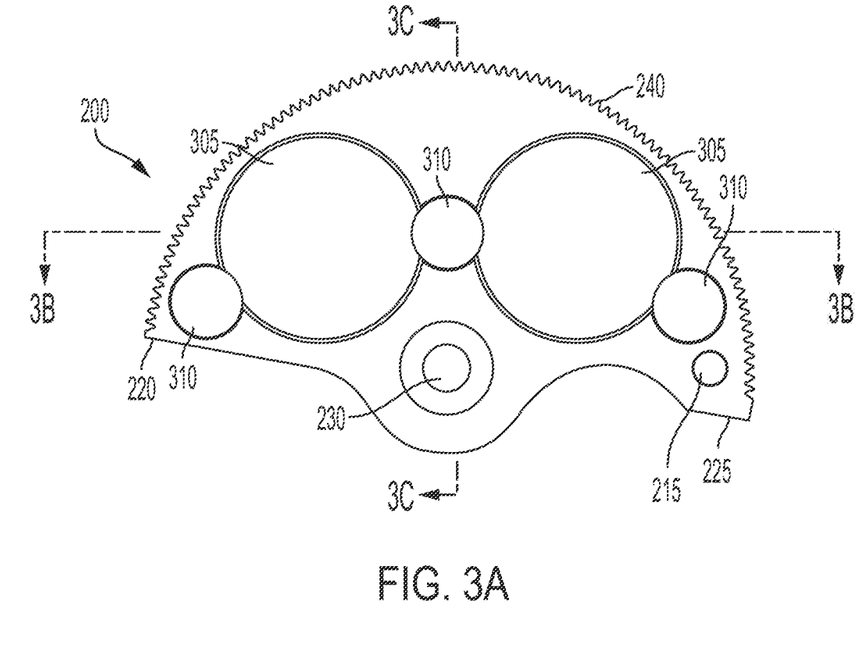
FIG. 3A shows a top plan view of an optical wheel with optical elements mounted thereon.
Figure 4A:
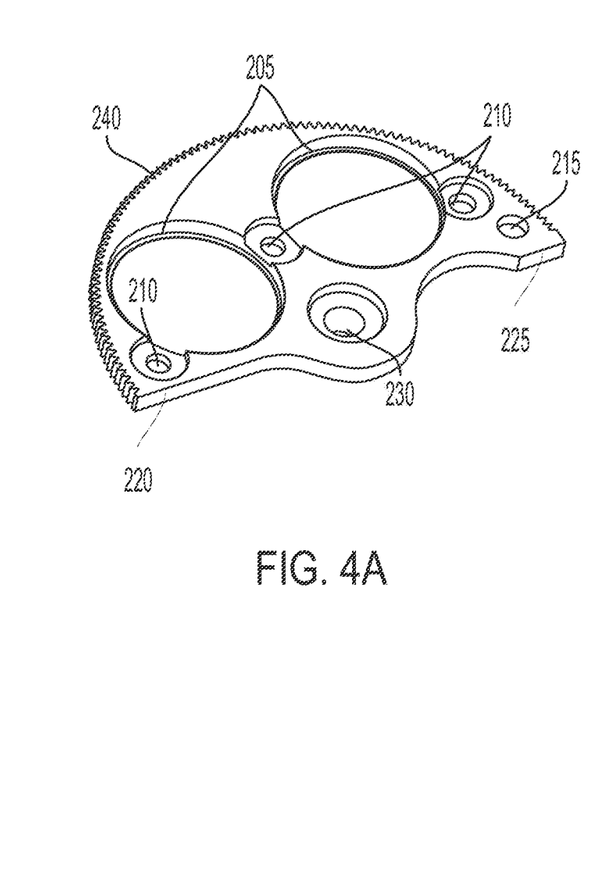
FIG. 4A shows a top perspective view of the optical wheel shown in FIG. 2A.
Figure 4B:
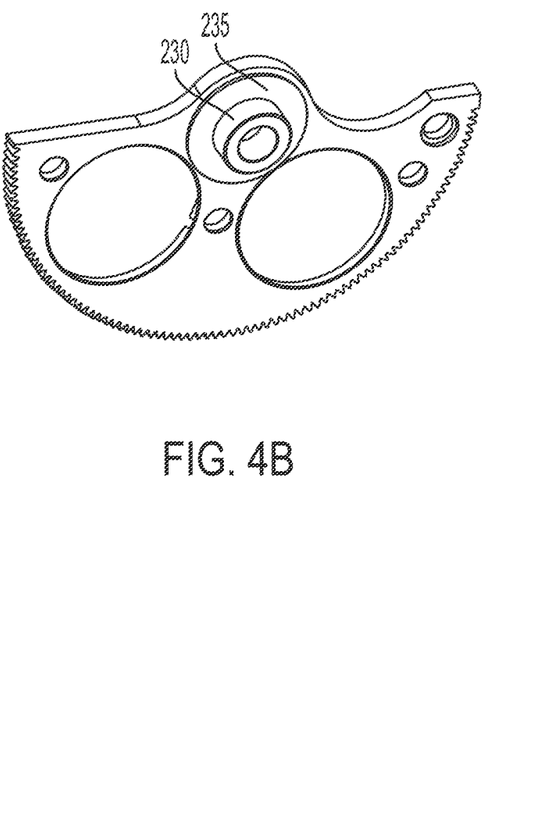
FIG. 4B shows a bottom perspective view of the optical wheel shown in FIG. 2A.

Referring now to FIGS. 2A, 3A, 4A, and 4B which show top plan views and top and bottom perspective views, respectively, of an optical wheel 200 according to an exemplary embodiment of the disclosure. FIGS. 2A, 4A and 4B show the optical wheel 200 without optical elements installed, and FIG. 3A shows the optical wheel 200 with optical elements 305 installed. Examples of optical elements 305 are, but are not limited to, fluorescence observation filters, lenses, etc.

Figure 2B:
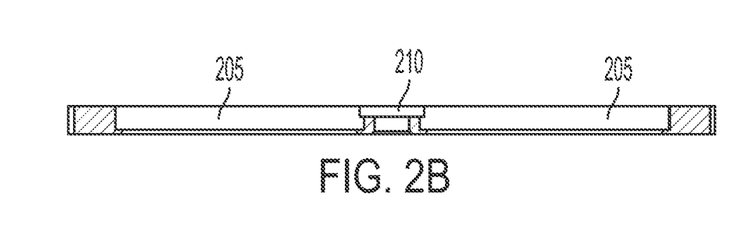
FIG. 2B shows a first sectional elevational view of the optical wheel shown in FIG. 2A.
Figure 3B:
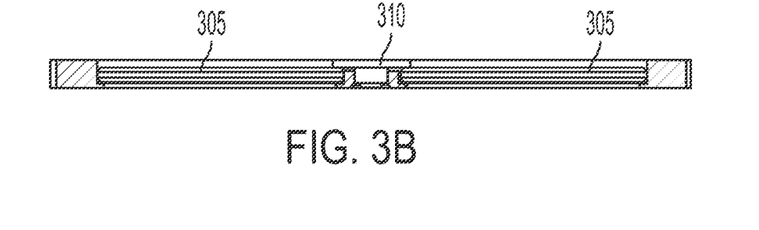
FIG. 3B shows a first sectional elevational view of the optical wheel shown in FIG. 3A.
Figure 7A:
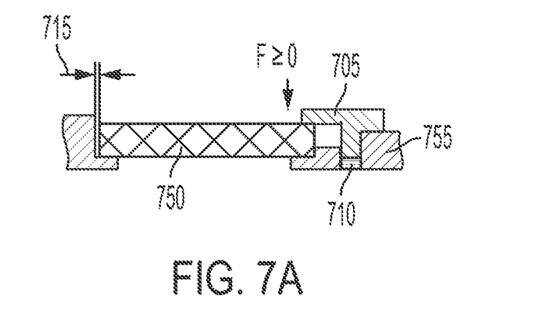
FIG. 7A shows a first arrangement for securing an optical element in an optical wheel according to an exemplary embodiment of the disclosure.
Figure 7B:
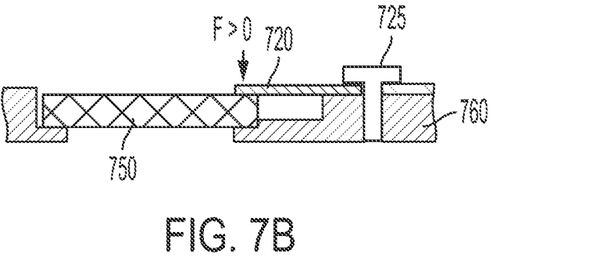
FIG. 7B shows a second arrangement for securing an optical element in an optical wheel according to an exemplary embodiment of the disclosure.
Figure 7C:
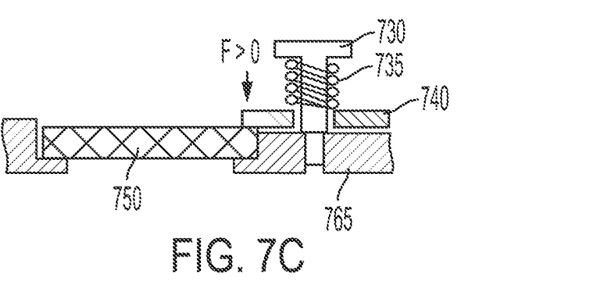
FIG. 7C shows a third arrangement for securing an optical element in an optical wheel according to an exemplary embodiment of the disclosure.

As shown in FIG. 2A, the optical wheel 200 includes openings 205 for receiving the optical elements 305. The optical elements 305 may be secured in the openings 205 by optical element holders 310. For this purpose, the optical wheel 200 includes through holes 210 into which the optical element holders 310 are placed. Various types of optical element holders 705, 725, and 730 are shown in FIGS. 7A to 7C. How these various types of element holders may be mounted on an optical wheel 755 is discussed in further detail below. The openings 205 and the through holes 210 are also shown in FIG. 2B which is a sectional elevational view of the optical wheel shown in FIG. 2A. The optical elements 305 mounted on the optical wheel 200 with optical element holders 310 are also shown in FIG. 3B which is a sectional elevational view of the optical wheel shown in FIG. 3A.

Figure 2C:
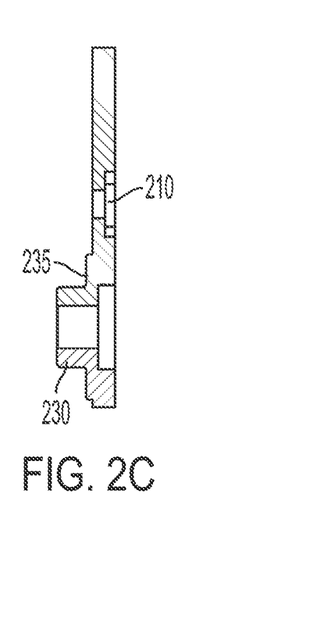
FIG. 2C shows a second sectional elevational view of the optical wheel shown in FIG. 2A.
Figure 3C:
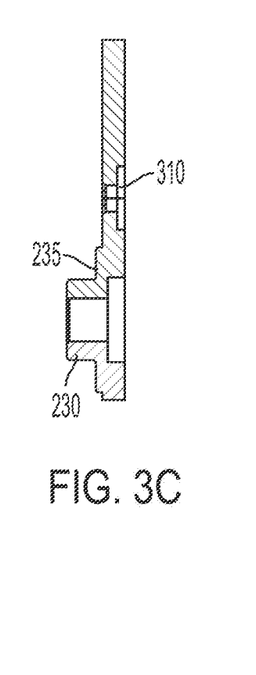
FIG. 3C shows a second sectional elevational view of the optical wheel shown in FIG. 3A.
Figure 8:
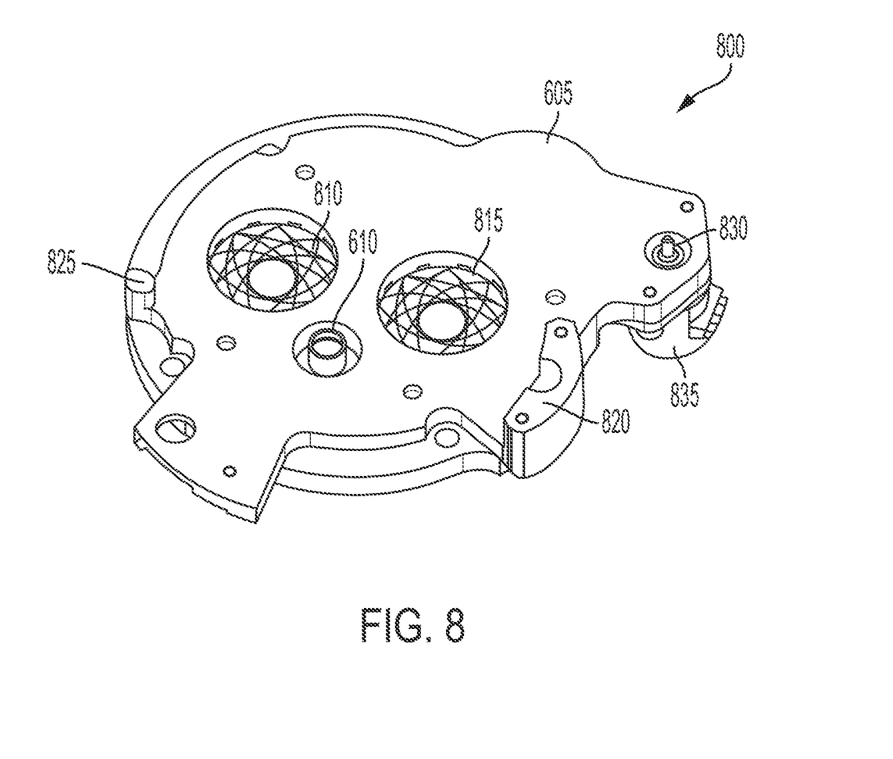
FIG. 8 shows a top perspective view of an iris diaphragm assembly according to an exemplary embodiment of the disclosure.

Optical wheel 200 further includes a wheel bearing to rotatably mount the optical wheel 200 on an iris diaphragm assembly, e.g., iris diaphragm assembly 800 shown in FIG. 8. As shown in FIGS. 2C and 3C, the wheel bearing has a cylindrical portion 230 and a portion 235 having a shape of a washer. The cylindrical portion 230 fits around a cylindrical wheel bearing 610 of the iris diaphragm assembly 800. The wheel bearing of the optical wheel 200 and the cylindrical wheel bearing 610 of the iris diaphragm assembly 800 form a wheel bearing arrangement having a predefined guide length that prevents the optical wheel 200 from self-locking when the optical wheel 200 is rotated on the iris diaphragm assembly 800. The wheel bearing arrangement 600 is shown in further detail in FIG. 6 below.

Figure 2D:
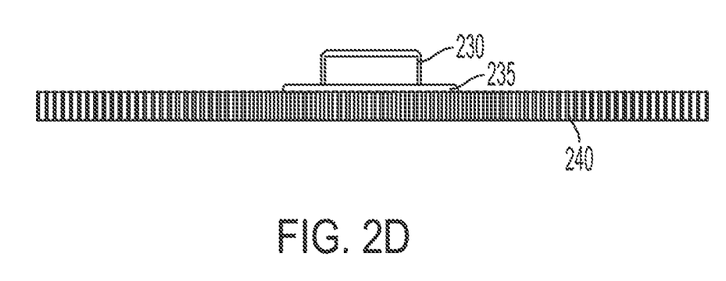
FIG. 2D shows a front elevational view of the optical wheel shown in FIG. 2A.

As shown in FIGS. 2A and 3A, the optical wheel 200 has substantially a shape of a half wheel with an almost straight portion that leads to a first stop surface area 220, a second partially semicircular portion that leads to a second stop surface area 225, and an external gearing 240 (also shown in FIG. 2D) provided on an another semicircular portion of the optical wheel 200 facing away from the almost straight portion that leads to the first stop surface area 220 and the second partially semicircular portion that leads to the second stop surface area 225. A motor 840 is connected to the optical wheel 200 via the external gearing 240 to rotate the optical wheel between a first stop position shown in FIG. 10, in which the optical elements 305 are positioned in the first and second observation beam paths 150 and 160, and a second stop position shown in FIG. 11, in which the entire optical wheel 200 is located outside the first and second observation beam paths 150 and 160.

As shown in FIGS. 2A and 3A, optical wheel 200 includes recess 215 into which a magnet may be placed according to an exemplary embodiment of the disclosure. The magnet interacts with a sensor 845 shown in FIGS. 9 and 10 configured to determine a position of the optical wheel 200.

The optical wheel 200 shown in FIGS. 2A and 3A can be made, but is not limited thereto, as injection molded parts, as machined turning parts, by hobbing, by profile milling, etc.

Figure 5:
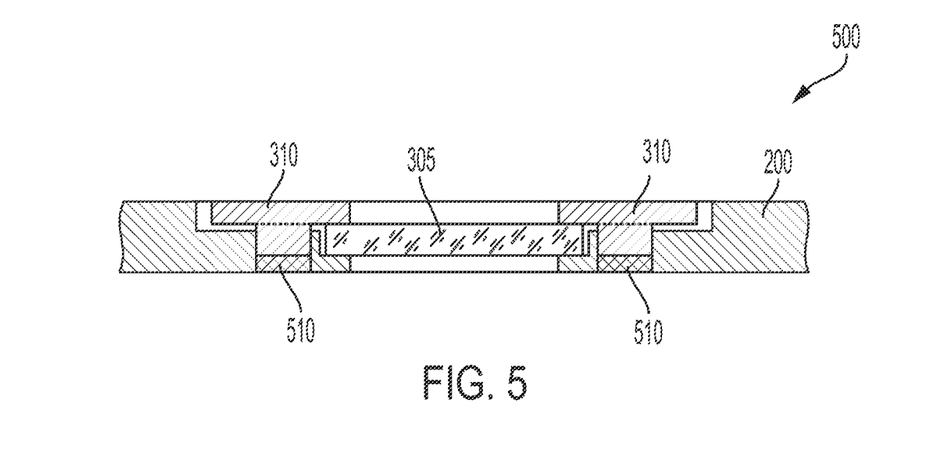
FIG. 5 shows an optical element secured in the optical wheel with an optical element holder fastened to the optical wheel with an adhesive.

FIG. 5 shows in more detail a fastening arrangement 500 for securing an optical element 305 secured in the optical wheel 200 with two optical element holders 310, each of which is fastened to the optical wheel 200 with an adhesive 510. As discussed above, optical elements such as optical filters may have complex coatings which cause stress and deformation on the optical element and may have a negative impact on the surface flatness of the optical element. Accordingly, when the optical element is secured in the openings of the optical wheel 200, additional transverse forces created by the fastening arrangement that would intensify the stress and deformation even further need to be avoided.

In the fastening arrangement 500 shown in FIG. 5, the optical element holders 310 do not pass through the entire through holes in the optical wheel 200. Open areas in the through holes, i.e., the lower portions of the through holes below the optical element holders 310 in FIG. 5 are filled with an adhesive 510. Notably, the adhesive 510 shown in FIG. 5 is not in contact with the optical element 305. Thus, the optical element 305 is secured in the optical wheel 200 by static friction between the optical element 305 and the optical element holders 310 and by static friction between the optical element 305 and a portion of the optical wheel 200. The static friction is a result of compression forces to which optical elements typically have a much higher tolerance with regard to stress and deformation than to transverse forces.

It is generally possible to design the optical element holders as clips (not shown) made of an elastic plastic material. However, such clips may require a minimum thickness or height of the optical wheel. Depending on the plastic material of which the optical the optical wheel is made, and depending on the design of clip, in particular the design of the snap arms, the clips may have a thickness or height of at least 3.4 millimeters (mm) to allow the snap arms to securely snap into respective areas of the optical wheel. By securing the optical element 305 as shown in FIG. 5, not only are transverse forces on the optical element 305 not created by the fastening arrangement, in addition, the fastening arrangement 500 allows a compact and space-saving design of the optical wheel which may result, e.g., in a thickness or height of the optical wheel 200 of 2.0 mm. Other thicknesses or heights, e.g., 1.5 mm or 2.5 mm are also possible. The smaller the thickness of the optical wheel, the more compact the surgical microscope or the optical device in which the optical wheel is integrated can be designed. In addition, a compact optical wheel design shortens the optical observation paths which generally improves the optical characteristics of the surgical microscope.

Figure 6:
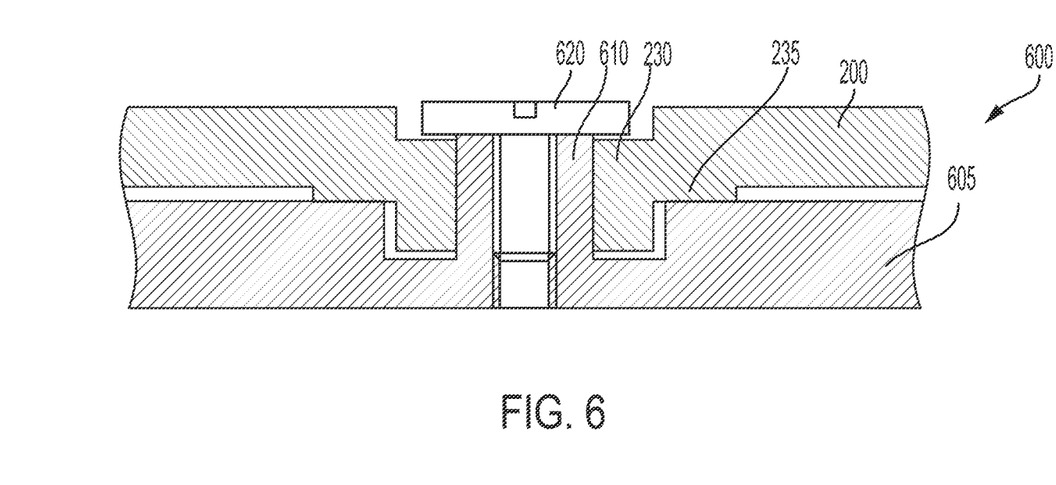
FIG. 6 shows a wheel bearing arrangement according to an exemplary embodiment of the disclosure.

Reference is now made to FIG. 6 which shows a wheel bearing arrangement 600 to rotatably mount the optical wheel 200 on a housing 605 of an iris diaphragm assembly. The housing 605 of the iris diaphragm assembly includes a first cylindrical wheel bearing 610. The optical wheel 200 includes a second wheel bearing having a cylindrical portion 230 that fits around the first cylindrical wheel bearing 610 and a portion 234 having a shape of a washer. The portion 234 defines a distance between the optical wheel 200 and the housing 605 of the iris diaphragm assembly when the optical wheel rests on the housing 605 of the iris diaphragm assembly. FIG. 6 further shows fastener 620 fasted in a recess within the first cylindrical wheel bearing 610. The fastener 620 may be, but is not limited thereto, a screw, a flat-head screw, a rivet, etc. As shown in FIG. 6, the optical wheel 200 is only secured upwardly by the flat-head screw 620.

The wheel bearing arrangement 600 has a predefined guide length that prevents the optical wheel 200 from self-locking and staggering.

Referring now to FIGS. 7A to 7C which schematically show various exemplary embodiments of fastening arrangements with optical element holders 705, 725, and 730. The different fastening arrangements illustrate various options to secure optical elements 750 in openings of optical wheels 755, 760, and 765. Each of the optical wheels 755, 760, and 765 have through holes to fasten the optical element holders 705, 725, and 730 to the optical wheels 755, 760, and 765, respectively. It goes without saying that although in each case only one optical element holder 705, 725, and 730 of the fastening arrangements to secure the optical element 750 is shown, it is also possible to provide two or more optical element holders per optical element 750.

Each of the fastening arrangements shown in FIGS. 7A to 7C generates only compression forces F which result in static friction, and to which optical elements typically have a much higher tolerance with regard to stress and deformation than to transverse forces.

Similar to the fastening arrangement 500 shown in FIG. 5, the optical element holder 705 shown in FIG. 7A does not pass through the entire through hole in the optical wheel 200. Open areas in the through hole, i.e., the lower portion of the through hole below the optical element holders 705 is filled with an adhesive 710. The optical element holder 705 may be made of a flexible material and/or the adhesive may be a flexible adhesive. It is possible to provide the adhesive 710 in other areas between the optical element holder 705 and the optical wheel 755, e.g., between the outer surface of the cylindrical portion of the optical element holder 705 that is positioned in the through hole and the inner side of the through hole. However, the adhesive in this exemplary embodiment is never in contact with the optical element 750.

It is possible to dimension the optical element holder 705 such that the compression force F is zero.

FIG. 7A also shows a gap 715 between the optical element 750 and an edge of the opening of the optical wheel 755 in which the optical element is secured. Such a gap is also present in the exemplary embodiments shown in FIGS. 7B and 7C. The gap ensures that the optical element can expand in a horizontal direction in case of temperature fluctuations.

FIG. 7B shows a second arrangement for securing an optical element 750 in an optical wheel 760. In this arrangement, a plate 720 holds the optical element 750 by applying compression pressure to the optical element. The plate 720 is pressed against the optical element 750 by optical element holder 725, which can be a screw, a flat-head screw, a rivet, etc.

FIG. 7C shows a third arrangement for securing an optical element 750 in an optical wheel 765. In this arrangement, a spring 735 create the compression force F which is transmitted to the optical element 750 via element 740. Element 740 may be a washer or a plate with an opening through which the optical element holder 730 passes before it is mounted on the optical wheel 765. If the optical element holder 730 is a screw, the compression force can be adjusted by rotating the screw.

Figure 7D:
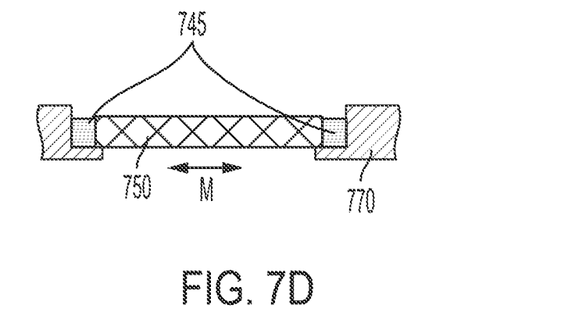
FIG. 7D shows a fourth arrangement for securing an optical element in an optical wheel.

FIG. 7D shows a fourth arrangement for securing an optical element 750 in an optical wheel 770. In the fourth arrangement, the optical element 750 is fastened to the optical wheel 770 by applying an adhesive 745 between the optical element 750 and edges of the optical wheel 770.

As discussed above, if the optical element 750 is an optical filter with complex coatings, these coatings may cause stress and deformation, and may have a negative impact on the surface flatness of the optical element 750. When these optical filters are glued into the optical wheel 770 as shown in FIG. 7D, additional transverse forces M may be created, e.g., as a result of a temperature change. These additional transverse forces M may intensify potential deformations of the optical element 750 even further. In this case, in order to counteract potential deformation, the optical element 750 must be made unnecessarily thick which does not support a compact design of the surgical microscope or optical device in which the optical wheel 770 is integrated.

In addition, thicker optical elements extend the optical observation paths which generally has a negative impact on the optical characteristics of the surgical microscope or optical device.

Reference is now made to FIG. 8 which shows a top perspective view of an iris diaphragm assembly 800. The iris diaphragm assembly 800 includes a first adjustable diaphragm 810 arranged in the first observation beam path 150 and defining a first opening. The iris diaphragm assembly 800 further includes a second adjustable diaphragm 815 arranged in the second observation beam path 160 and defining a second opening.

A motor 835 is connected to a gearbox (not shown) in the housing 605 of the iris diaphragm assembly 800 via an interface 830 to adjust diameters of the first and second openings. The motor 835 may be a stepper motor controlled by a control unit (not shown) to either continuously or incrementally adjust the diameters of the first and second openings. In an exemplary embodiment of the iris diaphragm assembly 800, the motor 835 may be controlled to adjust, but is not limited thereto, the first and second openings to diameters of 8 mm or 16 mm. When the motor 835 is controlled to continuously adjust the diameters of the first and second openings, any diameter between entirely closed openings and entirely opened openings can be adjusted.

By adjusting the diameters of the first and second openings, a DoF, i.e., a distance between positions along the optical axis of the observation beam paths between a nearest and a furthest surgical object or object detail that is in sharp focus is adjusted.

Figure 9:
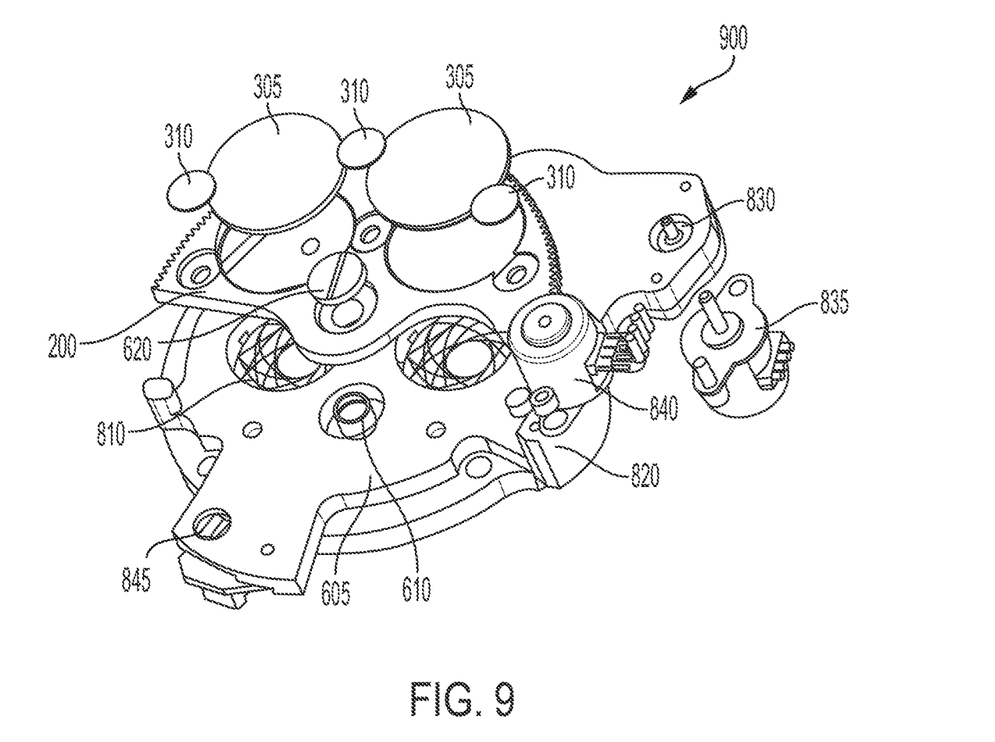
FIG. 9 shows a top exploded perspective view of an optical assembly according to an exemplary embodiment of the disclosure.
Figure 10:
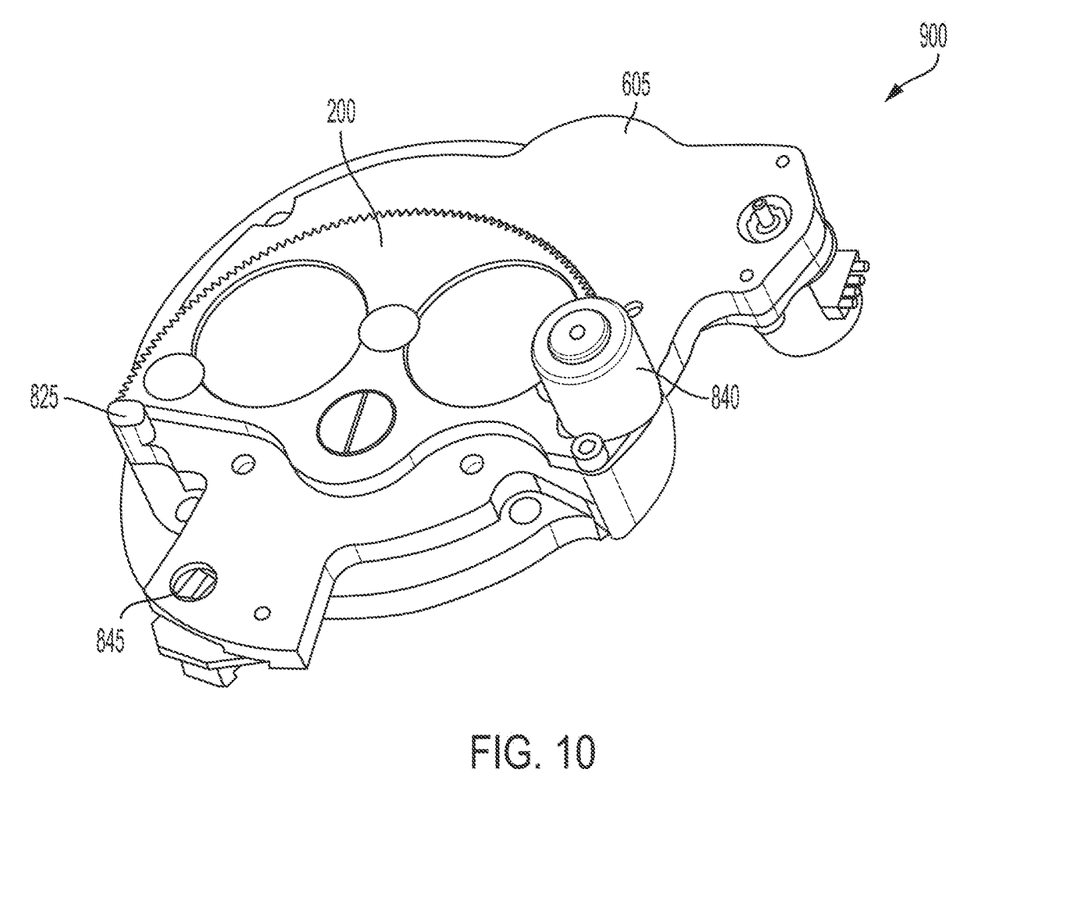
FIG. 10 shows a top perspective view of the optical assembly with the optical wheel in a first stop position.
Figure 11:
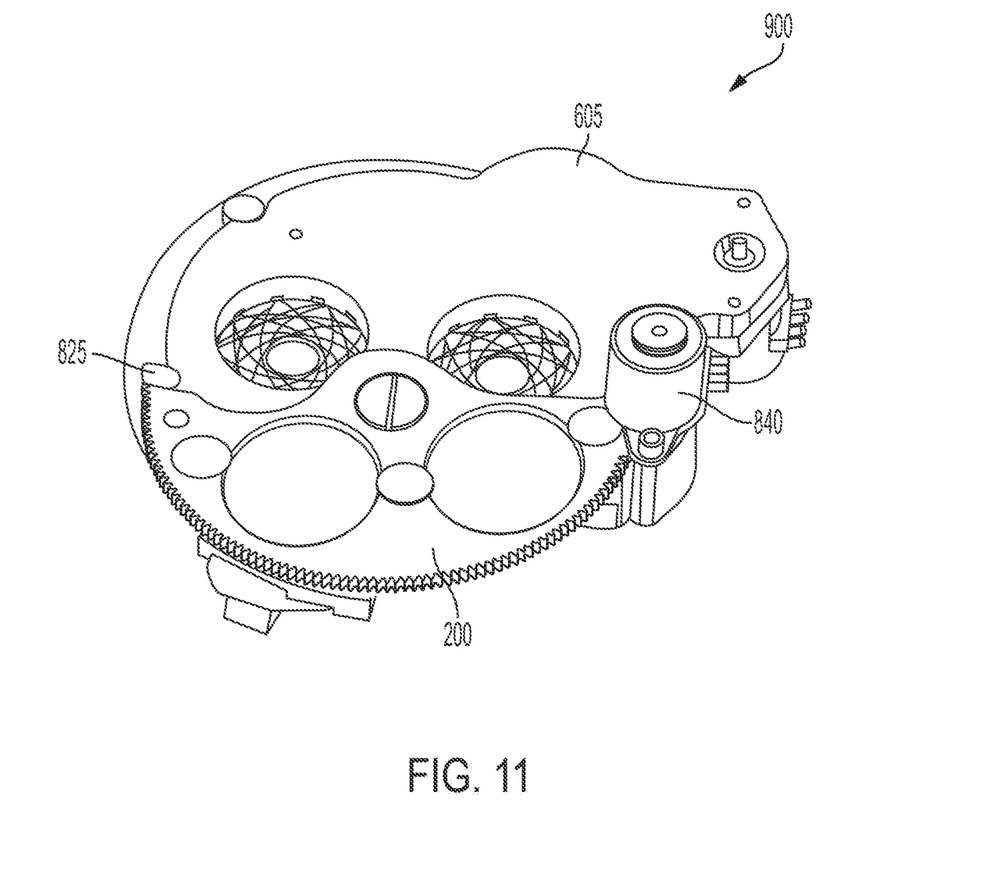
FIG. 11 shows a top perspective view of the optical assembly with the optical wheel in a second stop position.

FIG. 8 further shows first cylindrical wheel bearing 610 which is a bearing for mounting the optical wheel 200 on the iris diaphragm assembly 800, as shown in FIGS. 9 to 11, and as discussed in detail in conjunction with FIG. 6.

In addition, FIG. 8 shows stop pin 825 which defines a first and second stop position of the optical wheel 200 when the first stop surface area 220 of the second stop surface area 225 is in contact with the stop pin 825, respectively. The first stop position of the optical wheel 200 is shown in FIG. 10 and the second stop position of the optical wheel 200 is shown in FIG. 11.

Further, FIG. 8 shows an interface 820 for mounting a second motor 840 which rotates the optical wheel 200 between the first stop position and the second stop position.

FIG. 9 shows a top exploded perspective view of optical assembly 900. As shown in FIG. 9, optical elements 305 are fastened to optical wheel 200 by optical element holders 310. The optical wheel 200 is rotatably fastened to the housing 605 of the iris diaphragm assembly with flat-head screw 620 via first cylindrical wheel bearing 610 which is part of a wheel bearing arrangement shown in FIG. 6. Motor 840 for rotating the optical wheel 200 is mounted on interface 820, and motor 835 for adjusting diameters of the first and second openings of the iris diaphragm assembly is mounted on interface 830 in the housing 605 of the iris diaphragm assembly.

FIG. 9 further shows a sensor 845 which may be utilized in conjunction with a magnet installed in recess 215 of optical wheel 200 to determine a position of the optical wheel as an alternative, or in addition to, the arrangement with the stop pin 825 and the first and second stop surface areas 220 and 225 discussed in further detail with regard to FIGS. 10 and 11 below.

FIG. 10 shows a top perspective view of optical assembly 900 with the optical wheel 200 in a first stop position in which the first stop surface area 220 of the optical wheel 200 is in contact with the stop pin 825. FIG. 11 shows a top perspective view of optical assembly 900 with the optical wheel 200 in a second stop position in which the second stop surface area 225 of the optical wheel 200 is in contact with the stop pin 825. These two positions of the optical wheel 200 are the only positions that are permitted during normal operation of the surgical microscope. The optical elements in the optical wheel 200 may be fluorescence observation filters. When the surgical microscope is operated in fluorescence mode, the optical wheel 200 is rotated by the motor 840 counterclockwise until the first stop surface 220 is in contact with the stop pin 825 and the fluorescence observation filters are positioned in the first and second observation beam paths 150 and 160.

When the surgical microscope is operated in white light mode, the optical wheel 200 is rotated by the motor 840 clockwise until the second stop surface 225 is in contact with the stop pin 825 and the entire optical wheel 200 including the fluorescence observation filters is positioned outside the first and second observation beam paths 150 and 160.

The motor 840 may be a stepper motor. Whether the optical wheel 200 is at a stop position can be determined by counting the steps or by measuring the elapsed time. This can be performed based on a predetermined number of steps and a predetermined time known to be required to rotate the optical wheel 200 to the stop position regardless of the starting position.

According to another exemplary embodiment, instead of, or in addition to, the stop pin 825 and the first and second stop surfaces 220 and 225 of the optical wheel 200, the position of the optical wheel 200 can be determined by a sensor assembly which includes a magnet mounted in recess 215 of the optical wheel 200 and a sensor 845. The sensor 845 may be a hall effect sensor, i.e., a device which measures the magnitude of a magnetic field and outputs a voltage that is directly proportional to the magnetic field strength. When the magnet mounted in the recess 215 passes the sensor 845, the magnetic field strength changes which can be used to determine the position of the optical wheel 200.

In contrast to direct current (DC) motors, stepper motors have an internal measuring standard, which is why expensive external position measuring systems and/or encoders are not required for positioning tasks. For operating the optical wheel 200 in a positioning system, only one initialization option is required to obtain information on the absolute position of the wheel. For this purpose, either the stop pin 825 or the signal from the sensor 845 may be used. It is also possible to provide a pressure switch at the stop pin 825 which generates an initialization signal, so that the absolute position of the wheel can be determined. An advantage of the optical wheel 200 being a half wheel is that the sensor 845 can be dispensed with and the arrangement saves space and costs for the sensor. The sensor 845 can nevertheless provide the system with valuable services by providing a confirmation signal that the electrical motor 840 is functioning properly.

The optical wheel 200 may be made of opaque plastic material or of a metal. Therefore, the optical wheel 200 includes opaque areas formed by webs or other full-surface areas which block light transmitted in the observation beam paths 150 and 160 when the optical wheel 200 is rotated. In the event of a fault of the motor 840 or of the control unit controlling the motor 840, the optical wheel 200 may remain in an undesirable position in which the opaque areas of the optical wheel 200 may obscure or restrict the view of the surgical area 145. However, because the optical wheel has a shape of a half wheel and because of the arrangement of the openings 205 for receiving the optical elements 305 and the webs and opaque areas on the optical wheel, an amount of light in the first and second observation beam paths 150 and 160 blocked by opaque portions of the optical wheel 200 is minimized when the optical wheel is rotated between the first and second stop positions, and/or when the optical wheel 200 remains in a fault position so that the impact on the view of the surgeon during surgery is minimized. In addition, by configuring the optical wheel 200 as a half wheel, the weight of the optical wheel 200 is reduced in comparison with a full wheel design.

According to another exemplary embodiment, the optical wheel 200 may be made of a transparent material, e.g., a transparent plastic material, to prevent light in the first and second observation beam paths 150 and 160 from being blocked when the optical wheel 200 is rotated between the first and second stop positions.

In summary, an optical wheel for a surgical microscope, an optical assembly for a surgical microscope, and a surgical microscope including the optical assembly are provided. The optical assembly has a compact and space-saving design and provides a DoF option in combination with a fluorescence observation filter which can be positioned in the observation beam paths 150 and 160 in fluorescence mode and which can be moved outside the observation beam paths 150 and 160 when the surgical microscope is operated in white light mode.

Diameters of the first and second openings in the iris diaphragm assembly can be continuously or incrementally adjusted thereby adjusting the DoF. Furthermore, the diameters of the first and second openings, and thereby the DoF, can be adjusted independent from the swivel mode or position of the optical wheel.

Optical elements 305, such as the fluorescence observation filters utilized in the fluorescence mode of the surgical microscope, are fastened to the optical wheel 200 by optical element holders 310 without creating transverse forces on the optical elements 305.

It is understood that the foregoing description is that of the exemplary embodiments of the invention and that various changes and modifications may be made thereto without departing from the spirit and scope of the invention as defined in the appended claims.

LIST OF REFERENCE NUMERALS

| | |
|---|---|
| 100 | Stereoscopic surgical microscope |
| 105 | Observer |
| 110 | Pair of oculars |
| 115 | Binocular tube |
| 120 | Beam splitters |
| 125 | Optical wheel |
| 130 | Iris diaphragm assembly |
| 135 | Zoom optics |
| 140 | Main lens |
| 145 | Surgery area |
| 150 | First observation beam path |
| 160 | Second observation beam path |
| 200 | Optical wheel |
| 205 | Openings for receiving optical elements |
| 210 | Through holes |
| 215 | Recess |
| 220 | First stop surface area |
| 225 | Second stop surface area |
| 230 | Cylindrical portion |
| 235 | Portion having a shape of a washer |
| 240 | External gearing |
| 305 | Optical element |

-continued

| | |
|---|---|
| 310 | Optical element holder |
| 510 | Adhesive |
| 600 | Wheel bearing arrangement |
| 605 | Housing of iris diaphragm assembly |
| 610 | First cylindrical wheel bearing |
| 620 | Fastener |
| 705, 725, 730 | Optical element holders |
| 710 | Adhesive |
| 715 | Gap |
| 720 | Plate |
| 735 | Spring |
| 740 | Washer or plate |
| 745 | Adhesive |
| 750 | Optical element |
| 755, 760, 765, 770 | Optical wheel |
| F | Compression force |
| M | Transverse force |
| 800 | Iris diaphragm assembly |
| 810 | First adjustable diaphragm |
| 815 | Second adjustable diaphragm |
| 820 | Interface for mounting a motor |
| 825 | Stop pin |
| 830 | Interface for mounting a motor |
| 835, 840 | Motors |
| 845 | Sensor |
| 900 | Optical assembly |

What is claimed is:

1. An optical wheel for a surgical microscope, the optical wheel comprising:
    openings for receiving optical elements;
    optical element holders fastened to the optical wheel to secure the optical elements in the openings by static friction between the optical elements and the optical element holders without creating transverse forces on the optical elements; and
    the optical wheel having substantially a shape of a half wheel.

2. The optical wheel of claim 1, wherein the optical element holders are fastened to the optical wheel by an adhesive.

3. The optical wheel of claim 2, wherein:
    the optical wheel includes through holes to fasten the optical element holders to the optical wheel,
    the optical element holders, when fastened to the optical wheel, do not pass through the through holes entirely, and
    open areas in the through holes are filled with the adhesive such that the adhesive is not in contact with the optical elements.

4. The optical wheel of claim 1, further comprising:
    an external gearing provided on a circular portion of the optical wheel.

5. The optical wheel of claim 1, wherein the optical elements are fluorescence observation filters.

6. The optical wheel of claim 1, wherein the optical wheel has a thickness of 2.0 millimeters.

7. An optical assembly for a surgical microscope comprising:
    an iris diaphragm assembly arranged in a first plane and including a first adjustable diaphragm arranged in a first observation beam path of the surgical microscope and defining a first opening, and a second adjustable diaphragm arranged in a second observation beam path of the surgical microscope and defining a second opening;
    an optical wheel rotatably mounted on the iris diaphragm assembly in a second plane, the optical wheel including openings for receiving optical elements and optical element holders fastened to the optical wheel to secure the optical elements in the openings without creating transverse forces on the optical elements, the optical wheel having substantially a shape of a half wheel and including an external gearing provided on a circular portion of the optical wheel; and the first plane and the second plane being arranged above each other.

8. The optical assembly of claim 7, further comprising:
a first motor connected to the iris diaphragm assembly to adjust diameters of the first and second openings; and
a second motor connected to the optical wheel via the external gearing to rotate the optical wheel between a first stop position and a second stop position.

9. The optical assembly of claim 8, wherein:
the first motor is controlled to adjust diameters of the first and second openings thereby adjusting a depth of field of the surgical microscope.

10. The optical assembly of claim 8, wherein the first and second motors are stepper motors.

11. The optical assembly of claim 8, wherein:
the optical elements are fluorescence observation filters,
the fluorescence observation filters are positioned in the first and second observation beam paths when the optical wheel is in the first stop position, and
the optical wheel is positioned entirely outside the first and second observation beam paths when the optical wheel is in the second stop position.

12. The optical assembly of claim 8, wherein the openings for receiving the optical elements are arranged on the optical wheel such that an amount of light in the first and second observation beam paths blocked by opaque portions of the optical wheel is minimized when the optical wheel is rotated between the first and second stop positions.

13. The optical assembly of claim 12, wherein the optical wheel is made of a transparent material to prevent light in the first and second observation beam paths from being blocked when the optical wheel is rotated between the first and second stop positions.

14. The optical assembly of claim 8, wherein:
the optical wheel includes a first stop surface area and a second stop surface area,
the iris diaphragm assembly includes a stop pin,
in the first stop position, the first stop surface area of the optical wheel is in contact with the stop pin, and
in the second stop position, the second stop surface area of the optical wheel is in contact with the stop pin.

15. The optical assembly of claim 7, wherein:
the optical wheel includes a magnet mounted in a recess of the optical wheel, and the iris diaphragm assembly includes a sensor configured to determine a position of the optical wheel.

16. The optical assembly of claim 15, wherein the sensor is a hall effect sensor.

17. The optical assembly of claim 7, wherein:
the iris diaphragm assembly includes a first cylindrical wheel bearing,
the optical wheel includes a second wheel bearing having a cylindrical portion that fits around the first cylindrical wheel bearing and a portion having the shape of a washer and defining a distance between the optical wheel and the iris diaphragm assembly when the optical wheel is mounted on the iris diaphragm assembly, and
the first cylindrical wheel bearing and the second wheel bearing forming a wheel bearing arrangement having a predefined guide length that prevents the optical wheel from self-locking.

18. The optical assembly of claim 17, wherein the optical wheel is mounted on the iris diaphragm assembly by a flat-head screw fastened in a recess in the first cylindrical wheel bearing of the iris diaphragm assembly via a through hole in the cylindrical portion of the second wheel bearing of the optical wheel.

19. A surgical microscope comprising:
a housing;
a zoom optics mounted in the housing;
an iris diaphragm assembly mounted on the zoom optics, the iris diaphragm assembly being arranged in a first plane and including a first adjustable diaphragm arranged in a first observation beam path of the surgical microscope and defining a first opening, and a second adjustable diaphragm arranged in a second observation beam path of the surgical microscope and defining a second opening; and
an optical wheel rotatably mounted on the iris diaphragm assembly in a second plane, the optical wheel including openings for receiving optical elements and optical element holders fastened to the optical wheel to secure the optical elements in the openings without creating transverse forces on the optical elements, the optical wheel having substantially a shape of a half wheel and including an external gearing provided on a circular portion of the optical wheel.

20. The surgical microscope of claim 19, wherein:
the surgical microscope is a stereoscopic microscope, and
the optical elements are fluorescence observation filters.

* * * * *